United States Patent
Bordes et al.

(10) Patent No.: US 11,175,377 B2
(45) Date of Patent: Nov. 16, 2021

(54) PMCW-PMCW INTERFERENCE MITIGATION

(71) Applicant: UHNDER, INC., Austin, TX (US)

(72) Inventors: Jean P. Bordes, St. Charles, MO (US);
Curtis Davis, St. Louis, MO (US);
Wayne E. Stark, Ann Arbor, MI (US);
Otto A. Schmid, Morgantown, WV (US); Raghunath K. Rao, Austin, TX (US)

(73) Assignee: Uhnder, Inc., Austin, TX (US)

( * ) Notice: Subject to any disclaimer, the term of this patent is extended or adjusted under 35 U.S.C. 154(b) by 3 days.

(21) Appl. No.: 16/443,205

(22) Filed: Jun. 17, 2019

(65) Prior Publication Data
US 2019/0302224 A1 Oct. 3, 2019

Related U.S. Application Data

(63) Continuation of application No. 15/712,230, filed on Sep. 22, 2017, now Pat. No. 10,324,165, which is a continuation of application No. 15/416,219, filed on Jan. 26, 2017, now Pat. No. 9,772,397.

(60) Provisional application No. 62/375,065, filed on Aug. 15, 2016, provisional application No. 62/327,006, filed on Apr. 25, 2016, provisional application No.
(Continued)

(51) Int. Cl.
*G01S 7/02* (2006.01)
*G01S 13/931* (2020.01)
*G01S 13/32* (2006.01)

(52) U.S. Cl.
CPC ............ *G01S 7/023* (2013.01); *G01S 13/325* (2013.01); *G01S 13/931* (2013.01)

(58) Field of Classification Search
CPC ..................................................... G01S 7/023
See application file for complete search history.

(56) References Cited

U.S. PATENT DOCUMENTS

| 1,882,128 A | 10/1932 | Fearing |
| 3,374,478 A * | 3/1968 | Blau ................ G01S 13/52 342/159 |
| 3,735,398 A | 5/1973 | Ross |

(Continued)

FOREIGN PATENT DOCUMENTS

| EP | 0509843 | 10/1992 |
| EP | 0725480 | 11/2011 |

(Continued)

OTHER PUBLICATIONS

European Search Report dated Dec. 12, 2019 for corresponding EP Application No. EP17788891.4.

(Continued)

*Primary Examiner* — Marcus E Windrich
(74) *Attorney, Agent, or Firm* — Gardner, Linn, Burkhart & Ondersma LLP

(57) ABSTRACT

A radar system includes a transmitter, a receiver, and a processor. The transmitter is configured to transmit a radio signal. The receiver is configured to receive a radio signal which includes the transmitted radio signal reflected from an object in the environment. The processor is configured to control the transmitter and the receiver to at least one of mitigate interference in the received radio signals, and avoid interfering radio signals transmitted by another radio transmitter.

20 Claims, 8 Drawing Sheets

Related U.S. Application Data

62/327,005, filed on Apr. 25, 2016, provisional application No. 62/327,004, filed on Apr. 25, 2016.

(56) References Cited

U.S. PATENT DOCUMENTS

| | | |
|---|---|---|
| 3,750,169 A | 7/1973 | Strenglein |
| 3,896,434 A | 7/1975 | Sirven |
| 4,078,234 A | 3/1978 | Fishbein et al. |
| 4,176,351 A | 11/1979 | De Vita et al. |
| 4,566,010 A | 1/1986 | Collins |
| 4,612,547 A | 9/1986 | Itoh |
| 4,882,668 A | 11/1989 | Schmid et al. |
| 4,910,464 A | 3/1990 | Trett et al. |
| 4,939,685 A | 7/1990 | Feintuch |
| 5,001,486 A | 3/1991 | Bächtiger |
| 5,012,254 A | 4/1991 | Thompson |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,272,663 A | 12/1993 | Jones et al. |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,376,939 A | 12/1994 | Urkowitz |
| 5,379,322 A | 1/1995 | Kosaka et al. |
| 5,497,162 A | 3/1996 | Kaiser |
| 5,508,706 A | 4/1996 | Tsou et al. |
| 5,581,464 A | 12/1996 | Woll et al. |
| 5,654,715 A | 8/1997 | Hayashikura et al. |
| 5,657,021 A | 8/1997 | Ehsani-Nategh et al. |
| 5,657,023 A | 8/1997 | Lewis et al. |
| 5,691,724 A | 11/1997 | Aker et al. |
| 5,712,640 A | 1/1998 | Andou |
| 5,724,041 A | 3/1998 | Inoue et al. |
| 5,847,661 A | 12/1998 | Ricci |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,288,672 B1 | 9/2001 | Asano et al. |
| 6,307,622 B1 | 10/2001 | Lewis |
| 6,335,700 B1 | 1/2002 | Ashihara |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,424,289 B2 | 7/2002 | Fukae et al. |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,683,560 B2 | 1/2004 | Bauhahn |
| 6,714,956 B1 | 3/2004 | Liu et al. |
| 6,747,595 B2 | 6/2004 | Hirabe |
| 6,768,391 B1 | 7/2004 | Dent et al. |
| 6,865,218 B1 | 3/2005 | Sourour |
| 6,888,491 B2 | 5/2005 | Richter |
| 6,975,246 B1 | 12/2005 | Trudeau |
| 7,119,739 B1 | 10/2006 | Struckman |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,474,258 B1 | 1/2009 | Arikan et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 * | 9/2011 | Rappaport ............ H04W 64/00 455/456.1 |
| 8,044,845 B2 | 10/2011 | Saunders |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,154,436 B2 | 4/2012 | Szajnowski |
| 8,212,713 B2 | 7/2012 | Aiga et al. |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 8,994,581 B1 | 3/2015 | Brown |
| 9,121,943 B2 | 9/2015 | Stirlin-Gallacher et al. |
| 9,239,378 B2 | 1/2016 | Kishigami et al. |
| 9,239,379 B2 | 1/2016 | Burgio et al. |
| 9,282,945 B2 | 3/2016 | Smith et al. |
| 9,335,402 B2 | 5/2016 | Maeno et al. |
| 9,400,328 B2 | 7/2016 | Hsiao et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,720,080 B1 | 9/2017 | Rodenbeck |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 * | 10/2002 | Prismantas ............... H04L 1/20 455/63.1 |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0107030 A1 | 6/2004 | Nishira et al. |
| 2004/0138802 A1 | 7/2004 | Kuragaki et al. |
| 2004/0215373 A1 | 10/2004 | Won et al. |
| 2005/0069162 A1 | 3/2005 | Haykin |
| 2005/0090274 A1 | 4/2005 | Miyashita |
| 2005/0156780 A1 | 7/2005 | Bonthron et al. |
| 2005/0201457 A1 | 9/2005 | Allred et al. |

(56) References Cited

U.S. PATENT DOCUMENTS

| | | |
|---|---|---|
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1* | 5/2006 | Asai ............... H04B 1/0003 375/299 |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1* | 5/2007 | Fukuda ............... G01S 13/325 342/70 |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1* | 8/2007 | Shirakawa ............... G01S 13/24 342/70 |
| 2007/0200747 A1* | 8/2007 | Okai ............... G01S 13/222 342/70 |
| 2007/0263748 A1 | 11/2007 | Mesecher |
| 2007/0279303 A1 | 12/2007 | Schoebel |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1* | 1/2009 | Mahler ............... G01S 7/023 342/22 |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050092 A1* | 3/2012 | Lee ............... G01S 13/0209 342/146 |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0283987 A1* | 11/2012 | Busking ............... G01S 13/825 702/159 |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1* | 3/2013 | Shirakawa ............ G01S 13/347 342/146 |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1* | 3/2014 | Kishigami ............... G01S 7/023 342/118 |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0160335 A1* | 6/2015 | Lynch ............... G01S 13/343 342/194 |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |
| 2015/0234045 A1 | 8/2015 | Rosenblum |
| 2015/0247924 A1 | 9/2015 | Kishigami |

(56) References Cited

U.S. PATENT DOCUMENTS

| | | |
|---|---|---|
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2016/0003938 A1 | 1/2016 | Gazit et al. |
| 2016/0003939 A1 | 1/2016 | Olshansky et al. |
| 2016/0018511 A1 | 1/2016 | Nayyar et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |
| 2018/0003799 A1* | 1/2018 | Yang .................. G01S 7/354 |
| 2018/0175907 A1 | 1/2018 | Marr |

FOREIGN PATENT DOCUMENTS

| | | |
|---|---|---|
| EP | 2374217 | 4/2013 |
| EP | 2821808 | 7/2015 |
| FR | 2751086 | 1/1998 |
| WO | WO2015175078 | 11/2015 |
| WO | WO2015185058 | 12/2015 |
| WO | WO2016011407 | 1/2016 |
| WO | WO2016030656 | 3/2016 |
| WO | 2017059961 | 4/2017 |
| WO | WO2017175190 | 10/2017 |
| WO | WO2017187330 | 11/2017 |

OTHER PUBLICATIONS

Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.

Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.

European Search Report dated Jan. 10, 2020 for corresponding EP Application No. EP17814832.6.

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS,"in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

* cited by examiner

*PRIOR ART*
How Digital Radar work
Applying a Binary Code to the inverter block:
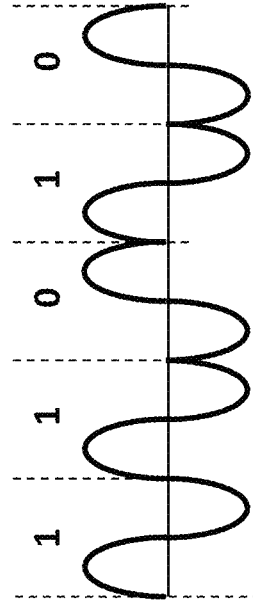
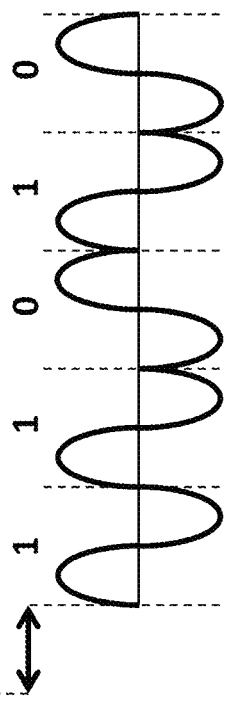
Receiving a Binary Code:
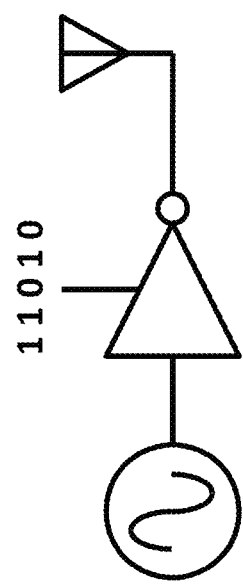
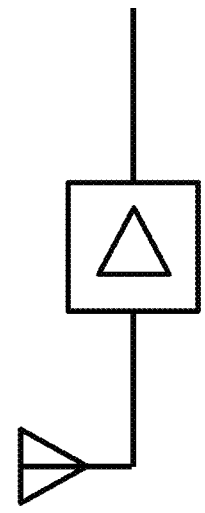
The returning wave form is strongly correlated with the used binary code.
FIG. 6

How Digital Radar work

Applying Pseudo Random Binary Code:

*PRIOR ART*

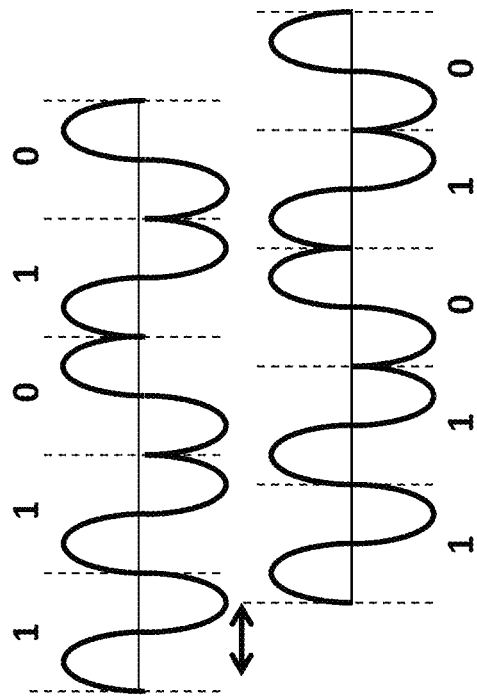

Transmit sequence with different phases:

Receive sequence with different phases:

Advantages for Detection:

- very sharp ambiguity function (thumbtack-like)
  ➔ no range-Doppler ambiguity
- MIMO in code-domain possible (higher angular resolution)
- Interference robustness
- Data from different sensors on different cars can be combined

Advantages for Implementation:

- Much lower ADC resolution required
- No need for high-speed, fast settling frequency synthesizers,
- No linearity requirements (higher range resolution)
- Possibility to embed/transmit information (e.g. vehicle ID)

FIG. 7

PMCW-PMCW INTERFERENCE MITIGATION

CROSS REFERENCE TO RELATED APPLICATIONS

The present application is a continuation of U.S. patent application Ser. No. 15/712,230, filed Sep. 22, 2017, now U.S. Pat. No. 10,324,165, which is a continuation of U.S. patent application Ser. No. 15/416,219, filed Jan. 26, 2017, now U.S. Pat. No. 9,772,397, which claims the filing benefits of U.S. provisional applications, Ser. No. 62/375,065, filed Aug. 15, 2016, Ser. No. 62/327,006, filed Apr. 25, 2016, Ser. No. 62/327,005, filed Apr. 25, 2016, and Ser. No. 62/327,004, filed Apr. 25, 2016, which are all hereby incorporated by reference herein in their entireties.

FIELD OF THE INVENTION

The present invention is directed to radar systems, and more particularly to radar systems for vehicles.

BACKGROUND OF THE INVENTION

The use of radar to determine range and velocity of objects in an environment is important in a number of applications including automotive radar and gesture detection. A radar system typically transmits a signal and listens for the reflection of the signal from objects in the environment. By comparing the transmitted signal with the received signal, a radar system can determine the distance to an object. Using multiple transmissions, the velocity of an object can be determined. Using multiple transmitters and receivers, the location (angle) of an object can also be determined.

There are several types of signals used in radar systems. One type of radar signal is known as a frequency modulated continuous waveform (FMCW). In this type of system, the transmitter of the radar system sends a continuous signal in which the frequency of the signal varies. This is sometimes called a chirp radar system. Mixing (multiplying) the reflected wave from a target with a replica of the transmitted signal results in a CW signal with a frequency that represents the distance between the radar transmitter/receiver and the target. By sweeping up in frequency and then down in frequency, the Doppler frequency can also be determined.

Another type of radar signal is known as a phase modulated continuous waveform (PMCW). For this type of signal, the phase of the transmitted signal is changed according to a certain pattern or code, sometimes called the spreading code, known at the radar receiver. The transmitted signal is phase modulated by mixing a baseband signal (e.g. with two values +1 and −1) with a local oscillator to generate a transmitted signal with a phase that is changing corresponding to the baseband signal (e.g., +1 corresponding to a phase of 0 radians and −1 corresponding to a phase of π radians). For a single transmitter, a sequence of phase values that form the code or spreading code that has good autocorrelation properties is required so that ghost targets are minimized. The rate at which the phase is modulated determines the bandwidth of the transmitted signal and is called the chip rate.

In a PMCW radar system, the receiver performs correlations of the received signal with time-delayed versions of the transmitted signal and looks for peaks in the correlation. The time-delay of the transmitted signal that yields peaks in the correlation corresponds to the delay of the transmitted signal when reflected off an object. The distance to the object is found from that delay and the speed of light.

A first radar system receiver may receive a signal from a second radar system transmitter that may be incorrectly interpreted by the radar system receiver as a reflected signal from an object. Such interference in phase-modulated continuous-wave (PMCW) radars is referred to as PMCW-PMCW interference.

SUMMARY OF THE INVENTION

Embodiments of the present invention provide methods and a system for a first radar system using PMCW modulation to detect interference from a second radar system. Embodiments of the present invention also provide methods and a system to mitigate the interference from the second radar system on the first radar system. The PMCW-PMCW interference is detected in a number of ways. One exemplary method includes measuring the noise floor at the receiver and determining when the noise floor has increased over previous measurements. In another aspect of the present invention, a second interfering PMCW radar may be discovered by turning off the transmitter of the first radar and the first radar correlating the received signal with a signal that would have been transmitted. If the correlation peaks in the receiver of the first radar system are consistent from one correlation to a second correlation, then a second radar system transmitting would be detected. A third method includes a first radar system's receiver correlating a received signal with codes not used by the first radar system's transmitter and orthogonal to the codes used at the transmitter of the first radar. A fourth method includes changing the frequency of the transmitter and measuring the interference at multiple frequencies.

The PMCW-PMCW interference may be mitigated in a number of ways. One exemplary method includes the use of Hadamard codes in the phase modulation of the transmitted signal. In accordance with another aspect of the present invention, in a radar system operable to measure the interference level, a frequency is selected that has minimal interference. In accordance with another aspect of the present invention, when the user PMCW radar and an interfering PMCW radar are synchronized and using Hadamard codes for phase modulation, orthogonal sets of modulation codes will be used, such that each radar would use a subset of the available codes and would not have any codes in common. In accordance with another aspect of the present invention, when the radar system is able to transmit radio signals at multiple carrier frequencies, a carrier frequency will be selected that does not contain as much interference as other carrier frequencies.

In accordance with the present invention, a radar sensing system for a vehicle comprises at least one transmitter, at least one receiver, and a processor. The at least one transmitter is configured for installation and use on a vehicle, and operable to transmit a radio signal. The at least one receiver is configured for installation and use on the vehicle, and operable to receive a radio signal that includes a reflected radio signal that is the transmitted radio signal reflected from an object. The at least one receiver is further operable to receive an interfering radio signal transmitted by a transmitter of another radar sensing system such that, without detection and mitigation, the interfering radio signal would be incorrectly interpreted by the receiver as one or more objects. The processor is able to detect the interference by performing at least one of (i) measuring a sequence of noise levels and determining when the noise level has increased, (ii) turning off the transmitter and comparing the correlation values from one correlation to the next correlation, (iii) correlating with codes not used by the transmitter, (iv) frequency hopping and measuring the interference at various frequencies. The processor is also able to mitigate the interfering radio signal by performing at least one of (i) modulating the transmitted signals with Hadamard codes, (ii) switching a carrier frequency to a carrier frequency outside the band of the interfering radio signal, and (iii) changing the spreading codes to distinguish interference from a second radar (ghost targets) from real targets.

In accordance with the present invention, a method for mitigating interference in a radar sensing system includes a transmitter and a receiver. The method includes transmitting with the transmitter a radio signal. The method also includes receiving with the receiver a radio signal. The received radio signal includes the transmitted radio signal reflected from an object. The receiver also receives an interfering radio signal transmitted by a transmitter of another radar sensing system. The interfering radio signal interferes with the reflected radio signal. The method further includes causing the transmitter to selectively transmit radio signals and selecting spreading codes that reduce interference based on measuring interference levels with different spreading codes.

These and other objects, advantages, purposes and features of the present invention will become apparent upon review of the following specification in conjunction with the drawings.

BRIEF DESCRIPTION OF THE DRAWINGS

FIGS. 5-7 illustrate aspects of how digital radar works; and

DESCRIPTION OF THE PREFERRED EMBODIMENTS

Figure 1:
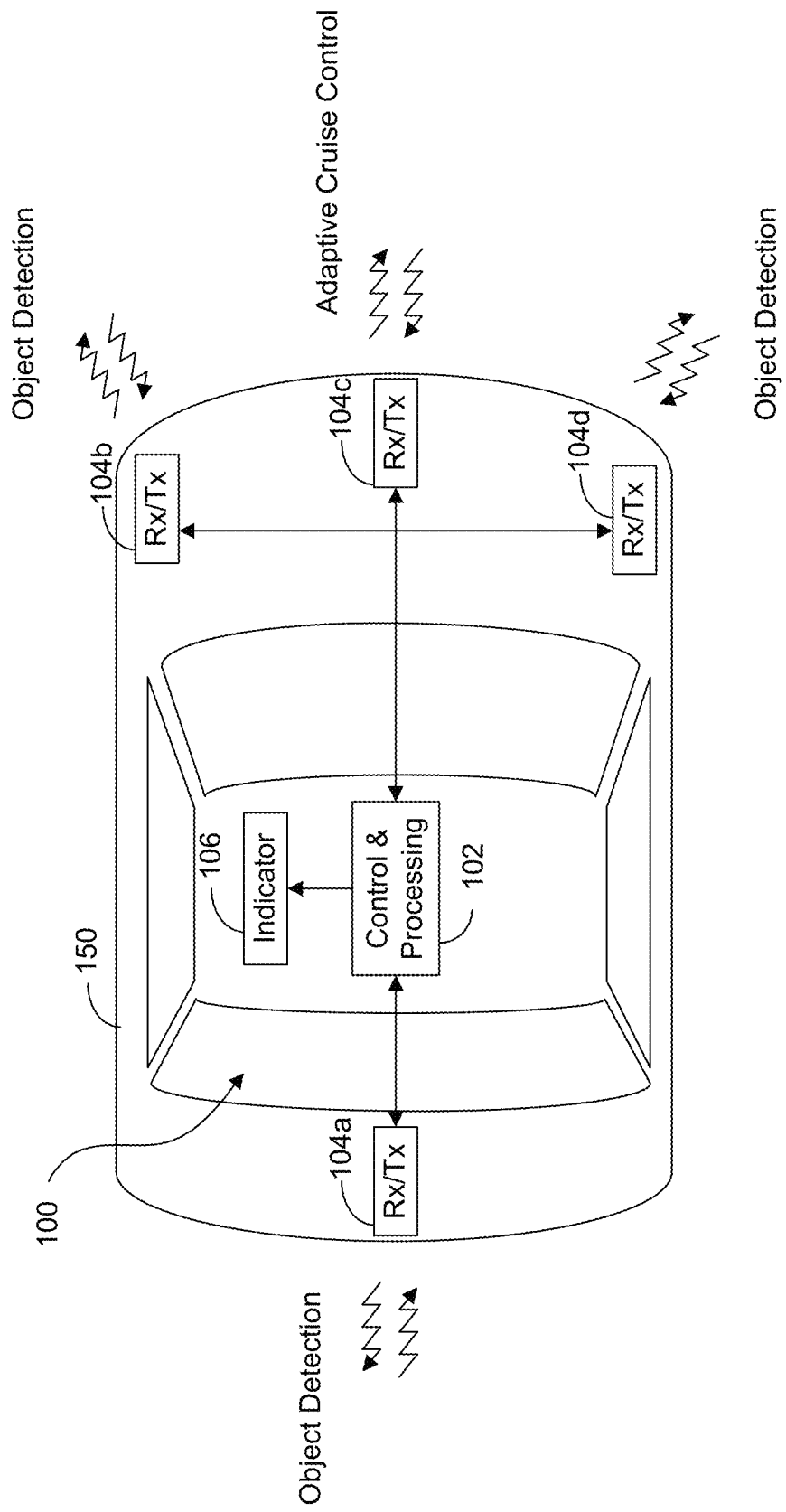
FIG. 1 is a plan view of an automobile equipped with a radar system in accordance with the present invention.

The present invention will now be described with reference to the accompanying figures, wherein numbered elements in the following written description correspond to like-numbered elements in the figures. Methods and systems of the present invention may detect and mitigate the interference caused by transmitted radio signals from another radar system. According to an aspect of the present invention, the interference of another PMCW radar may be detected through one or more methods that include passive steps as well as active steps. The interference is mitigated through one or more methods that include passive steps as well as active steps that may be taken after the presence of an interfering PMCW radar is detected.

A radar system utilizes one or more transmitters to transmit signals. These signals are reflected from objects (also known as targets) in the environment and received by one or more receivers of the radar system. A transmitter-receiver pair is called a virtual radar (or sometimes a virtual receiver).

The transmitted radio signal from each radar transmitter consists of a baseband transmitted signal, which is upconverted to an RF signal by an RF upconverter followed by an antenna. The upconverted RF signal may be obtained by mixing the baseband transmitted signal with a local oscillator signal at a carrier frequency. The baseband transmitted signal used for transmission by one transmitter of the radar system might, for example, consist of repeated sequences of random or pseudo-random binary values for one transmitter, e.g., (−1, −1, −1, −1, 1, 1, 1, −1, 1, 1, −1, −1, 1, −1, 1), although any sequence, including non-binary sequences and non-periodic sequences could be used and different sequences would be used for different transmitters. Each value of the sequence is often called a chip. A chip would last a certain duration called the chip time. The inverse of the chip time is the chip rate. That is, the chip rate is the number of chips per second. In an exemplary aspect of the present invention, the sequences of random binary values may be provided by a truly random number generator. The random bit stream (with values +1 or −1) from the truly random number generator may be multiplied with an output of pseudorandom binary values from a pseudorandom number generator (PRNG). Multiplying the binary values (with values +1 or −1) from the pseudorandom number generator and the truly random number generator may provide for a highly efficient, high-rate output randomized serial stream of bit values even when noise at the input of an ADC of the truly random number generator might have been colored (which could lower the rate at which random numbers could be generated by the ADC). Equivalently, if the representation of the binary values are 0 and 1, then the multiplying may be replaced with an exclusive or (XOR) operation.

The transmitted radio signals are reflected from objects in the environment and are received back at the radar receivers (or virtual receivers). Each object in the environment may reflect the transmitted radio signal. The received signal at the radar system would consist of the sum of the radio signals reflected from various objects (targets) in the environment. In addition, a second radar system operating in the vicinity of the first radar system will generate a transmitted signal that will be received by the first radar system and interfere with the reflected signals from the first radar system.

At the receiver (receive pipeline), the received signal is down converted by typical amplification, filtering, and mixing with in-phase and quadrature-phase components of an oscillator. The output after down conversion and sampling is a sequence of complex value digitized samples comprising a mathematical real component and a mathematical imaginary component that are provided to a processor. The baseband signals used at the transmitter and the reflected radio signals after down conversion in the receiver are provided to correlators. The complex valued digitized samples at the output of the down converter are correlated with various time-delayed replicas of the baseband transmitted signals for different receivers to produce complex correlation values over a certain duration. That is, a sequence of digitized samples that correspond to a certain time duration of the received signal are correlated with a time-delayed replica of the baseband transmitted signal. The process is repeated for subsequent samples thus producing a sequence of complex correlation values for a given time-delay. This process is also performed for different transmitter/receiver pairs (virtual receivers).

A particular correlator that has a replica that is matched in delay to the time delay of the reflected signal from an object would produce a large magnitude complex correlator output. A single correlator will produce a sequence of correlator outputs that are large if the reflected signal has a delay that matches the delay of the replica of the baseband transmitted signal. If the velocity of the radar system is different from the velocity of the object causing the reflection, there will be a Doppler shift in the frequency of the reflected signal relative to the transmitted signal. A sequence of correlator outputs for one particular delay corresponding to an object moving in the environment will have complex values that rotate at a rate related to the Doppler shift. Using a sequence of correlator outputs (also referred to as a scan), the Doppler shift may be estimated and thus the velocity of the object in the environment determined. The longer the sequence of correlator outputs used to estimate the Doppler frequency, the greater the accuracy and resolution of the estimation of the Doppler frequency, and thus the greater accuracy in estimating the velocity of the object.

The correlation values for various time delays and various virtual radars are arranged in two-dimensional arrays known as time slices. A time slice is a two-dimensional array with one dimension corresponding to delay or range bin and the other dimension corresponding to the virtual radar (transmitter-receiver pair). The samples are placed into respective range bins of the two-dimensional array (as used herein, a range bin refers to a distance range corresponding to a particular time delay corresponding to the round trip time of the radar signal from a transmitter, to the target/object, and back to the receiver). The virtual receivers of the radar system define one axis of the two-dimensional time slice and the range bins define a second axis of the two-dimensional time slice. Another new time slice comprising complex correlation values is generated every 2-30 microseconds. Over a longer time interval, herein referred to as a "scan" (typically, in a duration of 1-60 milliseconds or longer), multiple time slices are accumulated to form a three-dimensional radar data cube. One axis or dimension of the three-dimensional radar data cube is defined by time (of each respective time slice requiring 2-30 microseconds), while the receivers (or virtual radar) define a second axis of the three-dimensional radar data cube, and the range bins and their corresponding time delays define a third axis of the three-dimensional radar data cube. A radar data cube may have a preselected or dynamically defined quantity of time slices. For example, a radar data cube may include 100 time slices or 1,000 time slices of data. Similarly, a radar data cube may include different numbers of range bins.

A single correlator output corresponding to a particular range bin (or delay) is a complex value that corresponds to the sum of products between a time-delayed replica of the baseband transmitted signal—with a time-delayed replica corresponding to each range bin—and the received down converted complex samples. When a particular time-delayed replica in a particular range bin correlates highly with the received signal, it is an indication of the time delay (i.e., range of the target/object) for the transmitted signal that is received after reflecting from a target/object. Multiple correlators produce multiple complex correlation values corresponding to different range bins or delays. As discussed herein, each time slice contains one correlation value in a time series of correlation values upon which Doppler processing is performed (e.g., Fast Fourier Transform). In other words, a time series of complex correlation values for a given range bin is used to determine the Doppler frequency and thus the velocity of a target/object in the range bin. The larger the number of correlation values in the time series, the higher the Doppler resolution. A matched filter may also be used to produce a set of outputs that correspond to the correlator outputs for different delays.

There may be scans for different correlators that use replicas of the transmitted signal with different delays. Because there are multiple transmitters and multiple receivers, there may be correlators that process a received signal at each receiver that are matched to a particular transmitted signal by a particular transmitter. Each transmitter-receiver pair is called a "virtual radar" (a radar system preferably has 4 virtual radars, or more preferably 32 virtual radars, and most preferably 256 or more virtual radars). The receive pipeline of the radar system will thus generate a sequence of correlator outputs (time slices) for each possible delay and for each transmitter-receiver pair. This set of data is called a radar data cube (RDC). The delays are also called range bins. The part of the radar data cube for one point in the sequence of correlator outputs is called a time slice, and it contains one correlator output for each range bin and transmitter-receiver pair combination. Storing the radar data cube can involve a large amount of memory, as its size depends on the desired number of virtual radars (for example, 4-64 or more virtual radars), the desired number of range bins (for example, 100-500 or more range bins), and the desired number of time slices (for example, 200-3,000 or more time slices).

The complex-valued correlation values contained in a three-dimensional radar data cube may be processed, preferably by a processor established as a CMOS processor and coprocessor on a common/same semiconductor substrate, which is typically a silicon substrate. In one embodiment, the processor comprises fixed function and programmable CPUs and/or programmable logic controls (PLCs). Preferably, the system will be established with a radar system architecture (including, for example, analog RF circuitry for the radar, processor(s) for radar processing, memory module(s), and other associated components of the radar system) all on a common/same semiconductor substrate. The system may preferably incorporate additional processing capabilities (such as, for example, image processing of image data captured by one or more vehicle cameras such as by utilizing aspects of the systems described in U.S. Pat. Nos. 5,877,897; 5,796,094; 6,396,397; 6,690,268 and 5,550,677, which are hereby incorporated herein by reference in their entireties) within the common/same semiconductor substrate as well.

The ability of a continuous wave radar system to distinguish multiple targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Meanwhile, increasing Doppler resolution only requires a longer scan. A high Doppler resolution is very valuable because no matter how close two objects or targets are to each other, as long as they have slightly differing radial velocity (their velocity towards or away from the radar system), they can be distinguished by a radar system with a sufficiently high enough Doppler resolution. Consider a walking adult next to a walking child, where the adult is moving towards the radar system at 1.5 meters per second while the child is moving towards the radar system at 1.2 meters per second (ignoring how fast the radar system may be moving). If the Doppler resolution of the radar system is high enough, the radar system will be able to distinguish the two targets. However, if the radar system is only able to achieve Doppler resolutions of up to an exemplary 0.5 meters per second, the radar system will be unable to distinguish the two targets. Preferably, the Doppler resolution is 1 meter per second (m/s), more preferably 0.1 m/s, and most preferably less than 0.05 m/s.

FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more receivers 104a-104d, a control and processing module 102 and indicator 106. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2A:
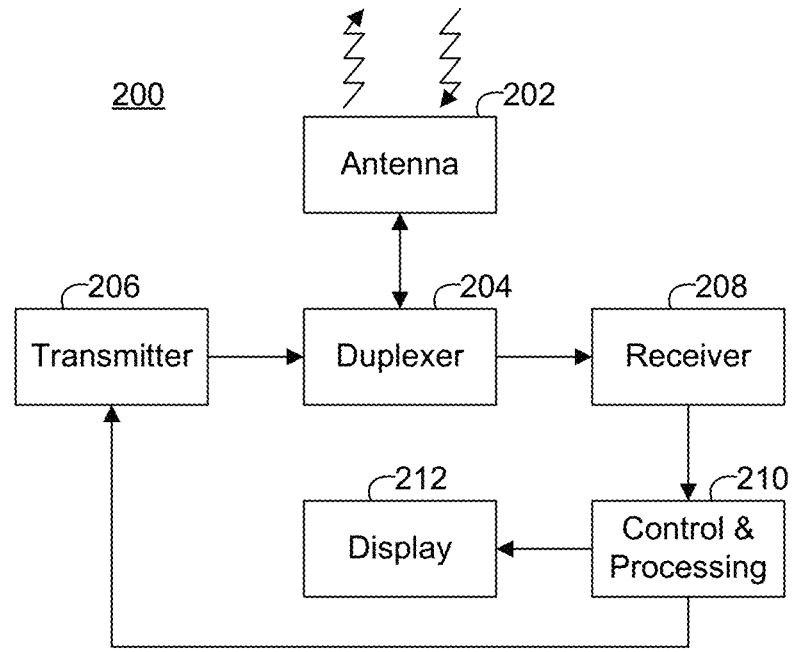
FIG. 2A and FIG. 2B are block diagrams of radar systems in accordance with the present invention.
Figure 2B:
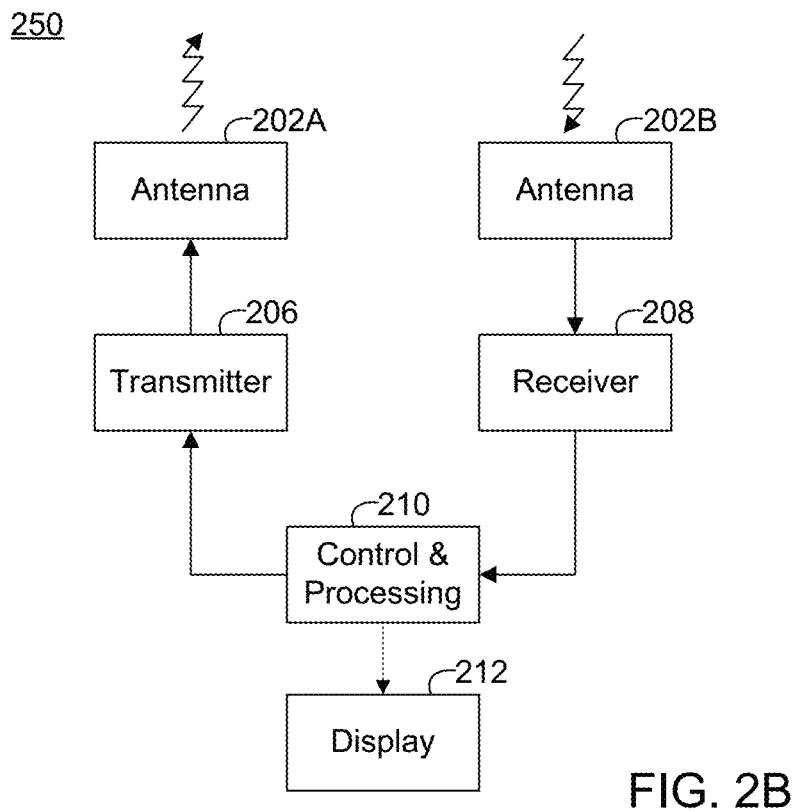

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. As discussed herein, the control and processing module 210 is also operable to produce a radar data output that is provided to other control units. The control and processing module 210 is also operable to control the transmitter 206. FIG. 2B illustrates an alternative exemplary radar system 250 with a pair of antennas 202a, 202b, a separate antenna 202a for the transmitter 206 and another antenna 202b for the receiver 208. While pulse radar systems may use shared or separate antennas, continuous wave radars (discussed herein) will use separate antennas (for transmitting and receiving) because of their continuous operation.

The radar sensing system of the present invention may utilize aspects of the radar systems described in U.S. Pat. Nos. 9,575,160, 9,599,702, and 9,753,121, and/or U.S. provisional applications, Ser. No. 62/382,857, filed Sep. 2, 2016, Ser. No. 62/381,808, filed Aug. 31, 2016, Ser. No. 62/327,003, filed Apr. 25, 2016, Ser. No. 62/327,004, filed Apr. 25, 2016, Ser. No. 62/327,005, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,017, filed Apr. 25, 2016, Ser. No. 62/327,018, filed Apr. 25, 2016, and/or Ser. No. 62/319,613, filed Apr. 7, 2016, which are all hereby incorporated by reference herein in their entireties.

Figure 5:
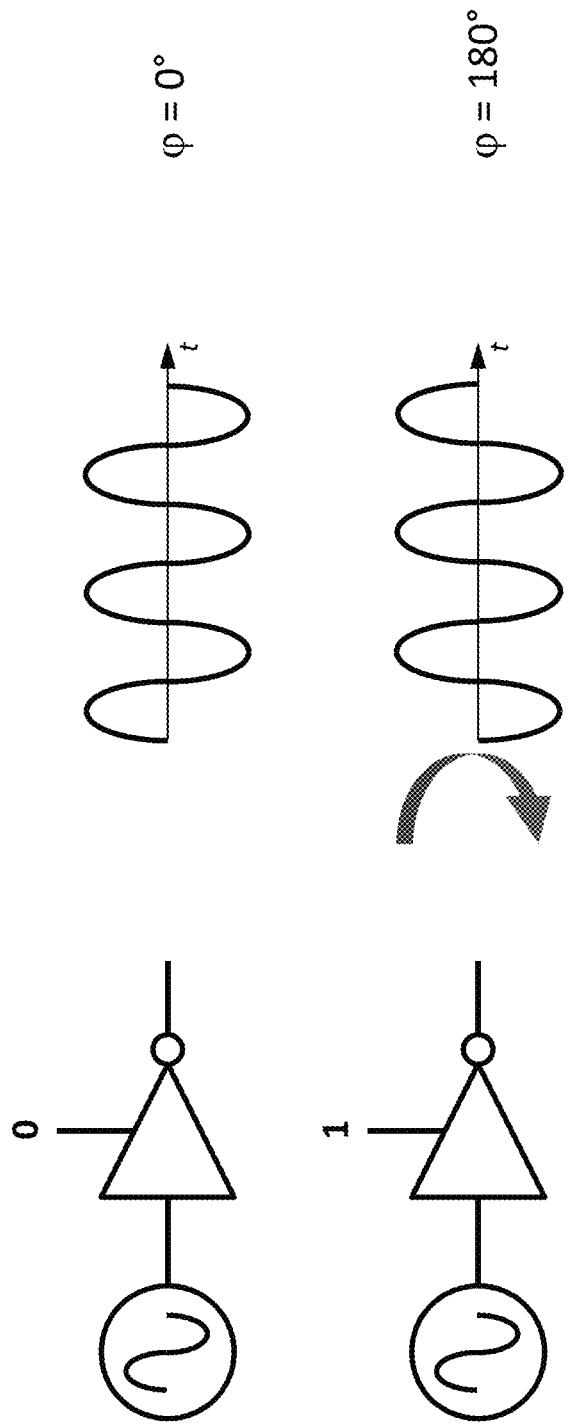

For a PMCW type of radar, the phase of the transmitted signal is changed according to a certain pattern or code, sometimes called the spreading code, known at the radar receiver (see FIGS. 5-7). The faster the phase is changed, the wider the bandwidth of the transmitted signal. This is sometimes called spread-spectrum because the signal power is spread over a wide bandwidth. As illustrated in FIGS. 5-7, the pattern may be implemented as a pseudorandom binary code, where 0s indicate no phase shift and 1s indicate a 180 degree (π radian) phase shift. In an aspect of the present invention, the pattern may be implemented as a truly random serialized bit stream. In an aspect of the present invention, there may be different types of codes, with each transmitter of a radar system using a separate code. In other modes each transmitter transmits with a single code that is modulated according to a Hadamard transform described below.

At the receiver, a bank of correlators may be used. Each correlator would have one input receiving the complex digitized samples from the down converter. The other input would be different delayed replicas of the transmitted baseband signal. The output of the correlators is used to detect objects in the environment, their location and velocity. Alternatively, a matched filter may be used that produces a so-called pulse compressed signal with time resolution proportional to the inverse bandwidth of the transmitted signal. The matched filter output sequence corresponds to the output of the bank of correlators. Spreading codes with good autocorrelation values are important in single transmitter, single receiver, phase-modulated continuous wave radars.

Radars with a single transmitter and a single receiver can determine distance to a target but cannot determine a direction or an angle of a target from the radar sensor or system. To achieve angular information, either multiple transmitters or multiple receivers (or both) are needed. The larger the number of transmitters and receivers, the better the resolution possible. A system with multiple transmitters and multiple receivers is also called a multiple-input, multiple-output or MIMO system. In a multiple transmitter, multiple receiver radar system, the receive pipeline for each receiver of the radar system may have a matched filter for each of the transmitter codes. A matched filter is an alternative way of implementing a set of correlators corresponding to different delays or range bins. As discussed herein, a quantity of virtual radars is defined by the number of transmitters and the number of physical receivers (quantity of transmitters times quantity of physical receivers equals the quantity of virtual radars). A receiver may also be referred to as a virtual receiver. A radar system with only a single transmitter will have virtual receivers that are physical receivers, which may still be referred to as virtual receivers.

A radar determines the range of an object or a distance to an object by determining how long it takes the echo of the transmitted signal to be heard back at the receive pipeline of the radar. From this measured time delay and knowing that the electromagnetic signals travel at the speed of light (or ultrasonic signals travel at the speed of sound) the distance can be determined. A typical way of determining the time delay is by correlating the received signal with multiple time-delayed replicas of the transmitted signal (via the use of range bins, as discussed herein). When a particular time-delayed replica corresponding to a particular range bin correlates highly with the received signal (which results in a larger magnitude of the correlation value as compared to a different time-delayed replica that does not correlate highly with the received signal), it is an indication of the time delay (or equivalent range) for the transmitted signal that is received after reflecting from an object. Because there can be multiple objects in the environment, there will be multiple time delays for which there will be high magnitude correlation values. While a receiver could correlate the received signal with all possible delays, generally there is a finite set of delays with which the receiver will correlate (that is, the range bins).

The ranges corresponding to the different time delays generated by replica signals are the above mentioned range bins. They may also be known as "range gates." The accuracy of range determination increases as the bandwidth of the transmitted signal increases (as the rate at which the phase of the signal changes) and as the number of time-delay replicas increase. A receiver that uses a matched filter may generate correlation values for all possible time delays (each range bin). This matched filter receiver will still have a range resolution that depends on the bandwidth of the transmitted signal.

A radar system can determine the velocity of an object by measuring the frequency offset between the transmitted signal and the received signal. The signal reflecting from a moving object will have a frequency shift relative to the transmitted signal. This is called the Doppler effect and the frequency shift is called the Doppler shift. Doppler is most noticeable with regards to trains passing through a road crossing where the frequency of the sound will go down once the train has passed the road crossing. The signal reflected off an object moving toward the radar sensor will have a higher frequency than the transmitted signal, and an object moving away will have a lower frequency. If the radar sensor is also moving, then it is the relative velocity between the radar sensor and the object that will determine the amount of frequency shift. Thus, measuring the frequency shift will determine the relative velocity of an object in the environment. The time duration of the received signal used to estimate the Doppler shift of the transmitted signal will determine the accuracy or resolution of the Doppler frequency.

The correlation of replicas of the transmitted signal modified at different time delays and different frequency shifts is an indication of the range and velocity of the objects in the environment. A virtual radar can estimate the range and velocity of objects in the environment.

Because there can be multiple objects in the environment with different ranges and different velocities there may be multiple reflections with different delays and different frequency shifts. It is important in many applications to measure the frequency shift for different objects at different ranges to determine the velocity of individual objects. Each object in a given range will generate a frequency shift that should be estimated.

The frequency shift of a received signal at a particular range bin may be measured by looking at the sequence of phase values of the correlator output of the receive pipeline over a set of correlations or time slices. The phase shift $\Delta\phi$ between two consecutive correlator outputs that are separated in time $\Delta T$ will correspond to a frequency shift, $\Delta f$, that can be determined as $\Delta f = \Delta\phi/\Delta T$. The longer the time duration of the transmitted signal, the more accurate the determination of frequency shift of an object at a particular range bin.

Figure 8:
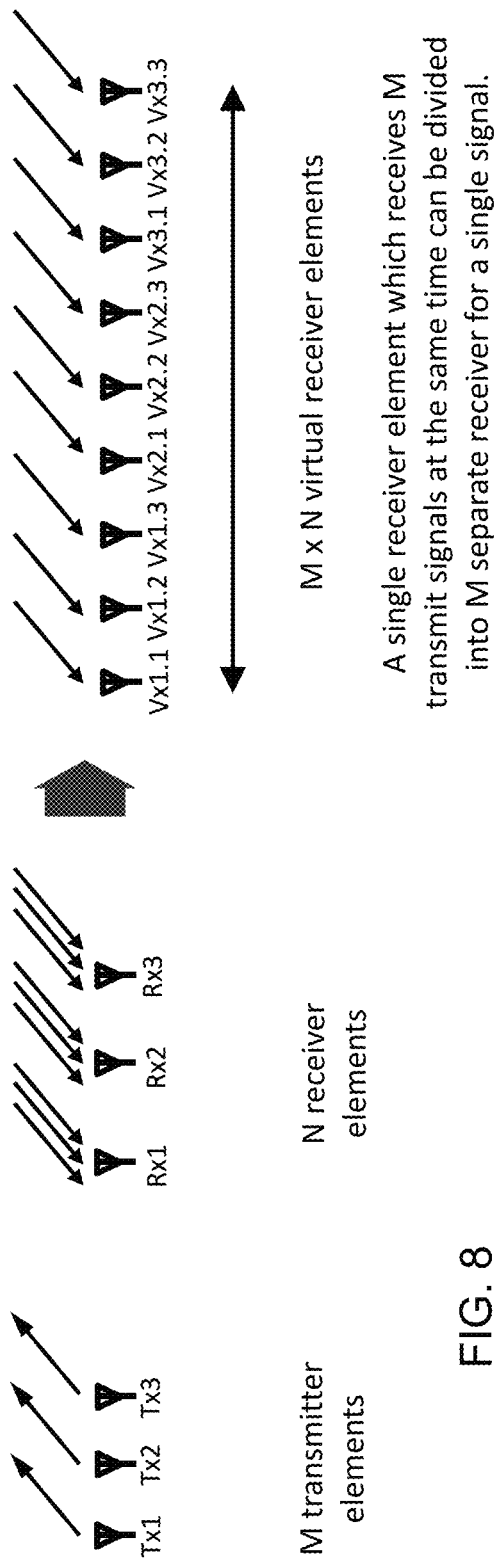
FIG. 8 illustrates capabilities of a multiple transmitter and multiple receiver radar system.

While the description above focused on a single transmitter-receiver pair, if there are $N_T$ transmitters and $N_R$ receivers there will be $N_T \times N_R$ virtual radars, one for each transmitter-receiver pair. For example, a radar system with eight transmitters and eight receivers will have 64 pairs or simply 64 virtual radars. As illustrated in FIG. 8, when three transmitters (Tx1, Tx2, Tx3) are being received by three receivers (Rx1, Rx2, Rx3), each of the receivers is receiving the transmission from all of the transmitters. Each of the receivers is receiving the sum of the reflected signals caused by all three of the transmissions at the same time. Each receiver may attempt to determine the range and Doppler of objects by correlating with delayed replicas of the signal from one of the transmitters. The physical receivers may then be "divided" into three separate virtual receivers, each virtual receiver correlating with a replica of one of the transmitted signals. In a preferred radar system of the present invention, there are 1-4 transmitters and 4-8 receivers, or more preferably 4-8 transmitters and 8-16 receivers, and most preferably 16 or more transmitters and 16-64 or more receivers.

Figure 3:
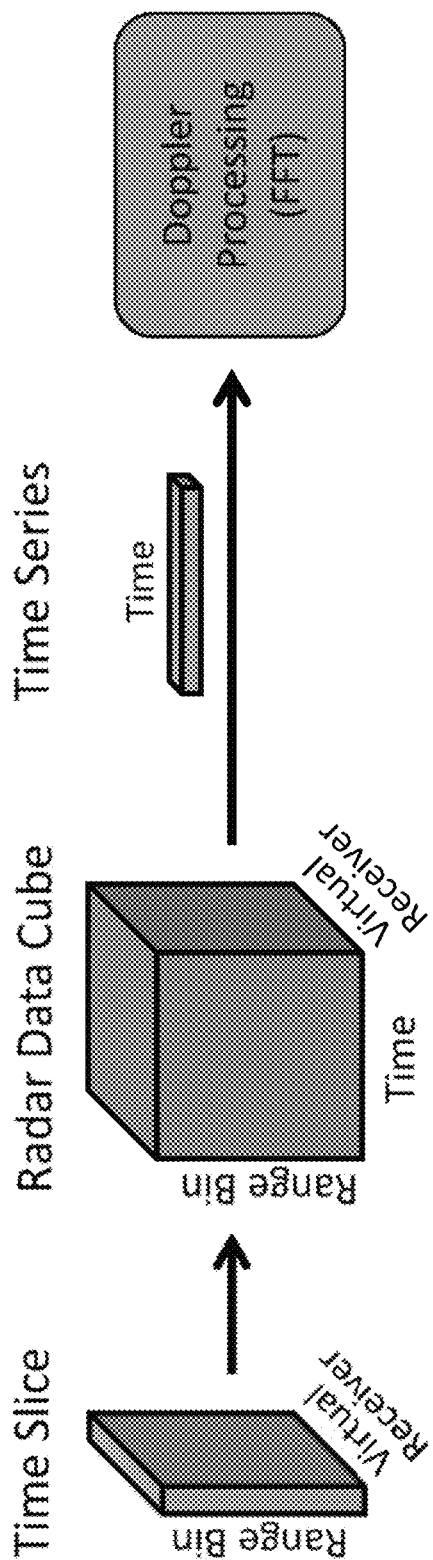
FIG. 3 is an block diagram illustrating a flow of information through a radar receiver of the radar system of FIG. 2.

Collecting and storing all the information to determine the range and velocity of each object corresponding to each virtual receiver requires significant memory resources. The required memory resources necessary to achieve sufficient Doppler resolution may run into the tens of megabytes to 100 megabytes or more. For example, the amount of memory necessary to store the complex correlation values for a single scan of 1,000 time slices from 64 virtual radars when that scan accumulates samples across 100 range bins for the 64 virtual radars would be more than 25 megabytes (see FIG. 3). In accordance with an aspect of the present invention, there are preferably 100 range bins, more preferably 200 range bins, and most preferably 500 range bins in each time slice.

Figure 4:
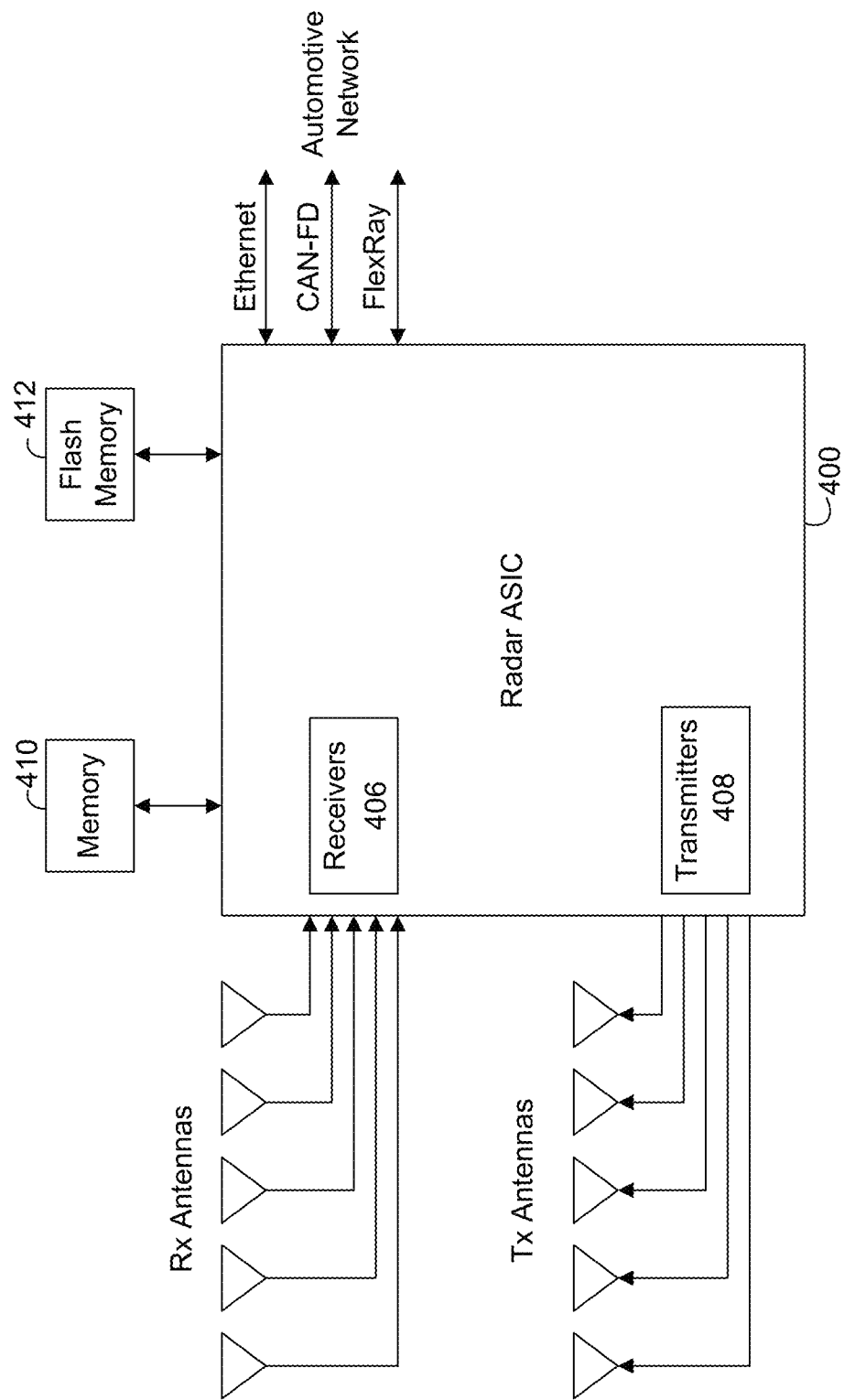
FIG. 4 is a block diagram illustrating a radar system with a plurality of receivers and a plurality of transmitters in accordance with the present invention.

FIG. 4 illustrates an exemplary phase modulated continuous wave radar system 400. As illustrated in FIG. 4, the radar system 400 comprises a plurality of receivers and their respective antennas 406 and a plurality of transmitters and their respective antennas 408. The radar system 400 also includes a flash memory 412, and optionally a random access memory 410. The random access memory 410, for example, an external DRAM, may be used to store radar data cube(s) instead of using the limited internal (on-chip) memory (e.g., SRAM), and may also be used to store selected range bins from a greater number of radar data cubes for concatenating for micro-Doppler processing. The radar system also includes a variety of interconnections to an automotive network, e.g., Ethernet, CAN-FD, and Flexray.

Hadamard Codes:

Hadamard codes may be used as modulation codes (spreading codes) in MIMO radars to avoid interference between co-located radar transmitters. The shortest Hadamard code is a code of length 2 usually denoted by $H_2$. An exemplary Hadamard code of length 2 ($H_2$) is illustrated in the matrix below:

$$H_2 = \begin{bmatrix} 1 & 1 \\ 1 & -1 \end{bmatrix}$$

The codewords or spreading codes are the rows in the matrix. In this example, the two codewords are (1, 1) and (1, -1). The two rows in this matrix are orthogonal in the sense that the sum of the products of the components is zero. That is, the product of the first element in each row (1, and 1 in the above example of a length 2 code), summed with the product of the second element in each row (1, and -1 above) is 1+(-1) or zero. The codewords can be repeatedly transmitted by a radar transmitter. In the above example a long sequence can be generated by repeating the same codeword. In this case we say the period is 2. A Hadamard of size 4 (length or period 4) can be constructed from a Hadamard of size two as follows. An exemplary Hadamard code of length 4 ($H_4$), which is constructed from the Hadamard of size two, is illustrated in the matrices below:

$$H_4 = \begin{bmatrix} H_2 & H_2 \\ H_2 & -H_2 \end{bmatrix} = \begin{bmatrix} 1 & 1 & 1 & 1 \\ 1 & -1 & 1 & -1 \\ 1 & 1 & -1 & -1 \\ 1 & -1 & -1 & +1 \end{bmatrix}$$

The Hadamard code of size four has four codewords which are the four rows of the above matrix. The codewords are orthogonal in the same sense as the two element Hadamard, namely that the sum of the products of the elements is zero. So any two distinct codewords (or rows) of the Hadamard matrix will be orthogonal. This process can be repeated to generate a Hadamard of size eight, and all powers of 2 (2, 4, 8, 16, 32 . . . ). There are Hadamard matrices in which the size is not a power of two as well. An exemplary Hadamard code of size or length 8 ($H_8$), which is also constructed from other Hadamard codes, is illustrated in the matrices below:

$$H_8 = \begin{bmatrix} +H_4 & +H_4 \\ +H_4 & -H_4 \end{bmatrix}$$

$$= \begin{bmatrix} +H_2 & +H_2 & +H_2 & +H_2 \\ +H_2 & -H_2 & +H_2 & -H_2 \\ +H_2 & +H_2 & -H_2 & -H_2 \\ +H_2 & -H_2 & -H_2 & +H_2 \end{bmatrix}$$

$$= \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix}$$

An exemplary radar system with four transmitters may use any four of the eight rows (codewords) of the Hadamard matrix for transmitting modulated signals. As long as the receiver uses the same four codes (as the transmitter) to correlate with, the signals transmitted by a first transmitter and reflected off an object will be orthogonal to any signals transmitted by other transmitters (in the same or different radars) that are reflected off the same object. Note that a first signal transmitted from a first transmitter that is reflected off of a first object will not be orthogonal to a second signal transmitted from a second transmitter that is reflected off of a second object, even in the same radar system.

A Hadamard code may be combined with other codes to generate an exemplary spreading code for each radar transmitter. For example, consider a code of length 7, namely c=[-1, -1, -1, 1, 1, -1, 1]. From this code and a Hadamard code of length four, a set of four spreading codes for modulating signals for the four transmitters may be generated. The four codewords are now of length (period) 28 but are still orthogonal. An exemplary combined spreading code and Hadamard code ($S_1$) is illustrated in the matrix below:

$$S_1 = \begin{bmatrix} +c & +c & +c & +c \\ +c & -c & +c & -c \\ +c & +c & -c & -c \\ +c & -c & -c & +c \end{bmatrix}$$

Such combinations of codewords and Hadamard codes may be extended by repeating the code c multiple times. For example, if d is M repetitions of c, so that d=[c, c, c, . . . , c] where there are M copies of c used to generate d, then the codewords of $S_2$, illustrated in the matrix below, are still orthogonal.

$$S_2 = \begin{bmatrix} +d & +d & +d & +d \\ +d & -d & +d & -d \\ +d & +d & -d & -d \\ +d & -d & -d & +d \end{bmatrix}$$

While Hadamard codes may be used as spreading codes to reduce interference between the virtual radars of a single radar system, they may also be used to aid in detecting and mitigating interferences from other PMCW radar systems.

PMCW-PMCW Interference Detection:

In accordance with an aspect of the present invention, an exemplary detection method includes determining whether there is a second PMCW radar operating and potentially interfering with a first PMCW radar by turning off the transmitter (or transmitters) of the first PMCW radar and monitoring for a received signal that was sent by the second PMCW radar. If the first and second PMCW radars are using different spreading codes but with identical periods, then the transmitted signal from the second radar will produce various cross correlations in the first PMCW radar when received by the first PMCW radar. If it is determined that the correlation values stay the same in each range bin, even when the transmitter is off, such correlation values are likely due to the PMCW radar receiving a transmitted signal from another PMCW radar. That is, if the correlations peaks stay nearly the same in every range bin from one set of correlation values to the next set when the transmitter is off, then an interfering second radar transmitter is likely the cause. By integrating or averaging over multiple correlations, these correlation values will accumulate coherently (with the same complex phase), at least over some number of correlations. Using this, the presence of a second PMCW radar can be determined.

When the two radars using codes with a different operational period or when at least one radar is using an aperiodic code (a code that does not repeat), the only indication of PMCW to PMCW interference is a raised noise floor. The radars can monitor the noise floor level in order to estimate the level of interference. When the radar(s) detect a rise in the noise floor level, one of the radars can switch to using a periodic code with the same period as the other radar, or both radars can switch to using a code with a known period (known a priori, for example, as part of a convention or standard, or by measuring the period used by the other radar). When the radar(s) switch to using periodic codes with the same period, ghosts will appear, and the noise level may go down (depending on the codes used).

Hadamard-Based Interference Detection:

Hadamard codes, as described above, are known orthogonal codes. A multiple-input radar may use Hadamard codes in order to avoid signal interference between virtual radars in a same radar system. The size of the Hadamard code matrix will be at least as long as the number of transmitters (e.g., a radar system with four transmitters will need a Hadamard code matrix with at least four rows of codewords). However, if the Hadamard code matrix is longer than the number of transmitters in a particular radar system, then there are codewords that will not be used by the transmitters. These extra codes may be used to determine noise or interference levels. For example, by correlating not only with the Hadamard codes being used, but also at least one Hadamard code not being used, the interference level may be measured with the Hadamard code not being used. In other words, when the receiver does a correlation with the additional Hadamard code (that is not used by the radar system's transmitters), significant correlation values will likely be due to another PMCW radar transmitting. Because the desired signal will be orthogonal to this extra code, the desired signal will not contribute to the interference measurement. In this way the level of interference alone may be determined while still measuring the range/velocity/angle of targets.

The above interference detection methods may also be combined with frequency hopping to listen and estimate channel interference levels as a function of frequency. In accordance with an aspect of the present invention, a PMCW radar's transmission frequency may be shifted between two or more frequencies in order to determine interference levels on a plurality of available frequencies. At each transmission frequency, a Hadamard-based spreading code may be used that contains more codewords than the number of transmitters in the PMCW radar. The unused codewords may be used to measure the interference as described above. The interference level may then be measured as a function of frequency. By measuring the interference at multiple frequencies, the transmitter can locate the frequency with the smallest amount of interference. As discussed herein, determining interference as a function of transmission frequency may be used as part of a mitigation technique in combination with carrier frequency shifting where the interference levels are determined to be lower than at another carrier frequency.

PMCW-PMCW Interference Mitigation:

Phase-modulated continuous-wave (PMCW) radars transmit phase-modulated signals. As discussed herein, the phase of the transmitted signal is modulated using a code, sometimes called a spreading code. As also discussed herein, the radar receiver receives signals reflected from objects, and correlations with delayed replicas of the transmitted waveform generated at the receiver are determined. The delays used for the correlations depend on the range at which an object should be detected. With this method, the range of an object may be determined by looking for peaks in the correlations. By repeating the correlations and processing a sequence of the correlations, the Doppler shift in the received signal compared to the transmitted signal can be estimated, and thus the object velocity may be estimated. In addition, by using multiple antennas, the angle of the object may also be determined.

A common concern with PMCW radars is that a second vehicle also using a PMCW radar may transmit phase-modulated signals that are received by a first vehicle's PMCW radar. In other words, the first vehicle's PMCW radar receives its own reflected signals that it transmitted as well as signals directly propagated from the second vehicle's PMCW radar. The first vehicle's PMCW radar receiving signals from the second vehicle's PMCW radar may cause the PMCW radar in the first vehicle to indicate objects that are not present, sometimes called ghost targets. This is especially true if the spreading code is periodic in that the sequence of chips in a spreading code repeats with some period. Discussed herein are a variety of methods and systems that may mitigate the effect of this interference.

A method of mitigating the effect of interference is to narrow the modulation bandwidth to avoid frequency bands that have significant interference. One radar system might use one frequency band that overlaps partially with another radar system when operating at the full bandwidth capability of each radar system. By narrowing the bandwidth of each system, the overlap can be eliminated and the interference between the signals reduced. One way to reduce the bandwidth is to change the chip rate of the modulated signal. By reducing the chip rate, the bandwidth occupied is reduced and the amount of overlap of the signals between different radars will be reduced.

Spreading Code Length Adjustments:

For PMCW radars using periodic spreading codes, a ghost target may appear in the same range bin for each set of correlation values corresponding to all range bins. That is, the correlation values for a set of range bins (delays) are repeated every time the code repeats. Therefore, another PMCW radar using the same operational period will show up as a ghost target in the same range bin from one period to the next period of the code (assuming a small relative velocity).

For example, using an exemplary vehicle moving at a relative velocity (of a second radar relative to a first radar) of 250 mph or 112 meters/second using a radar with a chip rate of 500 Mchps, the chip duration is 2 nano seconds and a sequence period is 500 chips, which corresponds to a 1 microsecond period. In this time period, the relative distance could change by only 112 micrometers. Since radio signals travel at the speed of light, the difference between a delay of a first period signal and a delay of a second period signal would be less than $2/10,000$ of a chip. Therefore, between periods of the sequence, the range bin of an object would not change significantly, even when moving very fast. That is, it will take about 5,000 periods of the sequence for the range of the object to change by the distance corresponding to a single chip (about 0.6 meters for the example calculation).

One mitigation technique to use if targets change range bins infrequently is to change the spreading code used and determine if the ghost target has moved, while other targets remain in the same range. If a target has moved, then it can be determined that the target is not an actual target but a ghost target due to a second transmitter. If the code is changed periodically and an average of correlations are computed, the ghost targets will be averaged out. In other words, while the ghost targets are still detected, because they are identified, they can be ignored. Such techniques may be used to reduce the interferences so that PMCW-PMCW interference is reduced to only particular Doppler values and/or particular angle bins.

Frequency Hopping Radars:

As mentioned above, in a PMCW radar system that can measure the interference levels of a plurality of possible transmission frequencies, the PMCW radar system may choose a transmission frequency that has a minimum of interference detected. Alternatively, a PMCW radar system, without knowing the interference levels at different carrier frequencies, may frequency hop from one carrier frequency to another carrier frequency. If two PMCW radars are both frequency hopping, but with different hopping patterns, the signal interference from one PMCW radar to the other PMCW radar will only occur when both PMCW radars hop to the same carrier frequency (such that both PMCW radars are simultaneously transmitting at the same carrier frequency). In such a way, a PMCW radar system may passively mitigate PMCW-PMCW interference without ever having to determine interference levels or take an action to avoid a specific interference occasion.

If the interference level is also monitored at each transmission frequency, an appropriate weighting of the different correlation values at different transmission frequencies may be used to minimize the effect of the interference. For example, transmission frequencies with a high level of interference may be nearly ignored while transmission frequencies with a low amount of interference can be given more weight in combining correlation outputs. In this system, users of different PMCW radars may not need to be coordinated or synchronized. With frequency hopping and weighting correlation values corresponding to carrier frequencies with minimal interference more heavily than correlation values corresponding to carrier frequencies with higher levels of interference, improved performance may be obtained.

Synchronized Hadamard Codes for Different Users:

Interference may also be mitigated to some extent by roughly synchronizing two PMCW radars. Such synchronization would have to be cooperative. For example, a first vehicle and a second vehicle may each have PMCW radars that are able to cooperate with each other to mitigate interference when the first vehicle is approaching the second vehicle. The largest signals received by the PMCW radars in this scenario are those transmission signals that are propagated directly from the first vehicle to the second vehicle, or vice versa. The time delays for these two propagation paths are identical. If both PMCW radars were synchronized, then each PMCW radar could transmit with different orthogonal code-based spreading codes, such as the Hadamard-based spreading codes described above, but with a unique set of codes. That is, each PMCW radar would use a subset of the available codes and the two subsets would not have any codes in common. If a delay between the first and second vehicles was known and one of the PMCW radars delayed transmission by this propagation delay, then the interference from one radar system would be orthogonal to the codes used by the other radar system.

For example, the first radar may transmit a signal (modulated by a codeword of the Hadamard code) from time 0 to time T. The second radar system would receive this signal from a time $\tau$ to T+$\tau$. This signal would reflect off the second vehicle and be received by the first radar system from a time $2\tau$ to T+$2\tau$. If the second radar system transmitted a signal from time $\tau$ to T+$\tau$, this second signal would be received by the first radar system from time $2\tau$ to T+$2\tau$. That is, the reflected signal from the first radar would be received back by the first radar synchronized with the signal transmitted from the second radar. Because both of the transmitted signals are phase modulated using orthogonal Hadamard codes and are synchronized, there would be no interference from the second radar to the first radar (as the two signals are orthogonal to each other and synchronized). However, there could still be interference when the second radar receives a transmitted signal from the first radar that is not synchronized with the signal received back by the second radar. Such arrangements may work well for one of the two radar systems but not the other. Optionally, the two radar systems could alternate which radar transmits with an appropriate delay to make the signals orthogonal at one of the two radar receivers.

If the propagation delays between vehicles are much smaller than the period of the Hadamard-based signal used, then even with a loose synchronization between signals, where the signals are offset but where only a few chips of the underlying sequence (not the Hadamard sequence) can be used, orthogonality may still be maintained at both radar receivers. In this case, one approach is to discard at the receiver one of the repetitions of the inner spreading code c. This gives up some signal processing gain but reduces the interference level.

Switching Operational Periods:

When the noise floor increases sufficiently (due to an interfering radar using a different operational period (or aperiodic)), a first PMCW radar of a first vehicle may turn off its transmitters for a known amount of time. A second PMCW radar of a second vehicle may notice that the first PMCW radar has stopped transmitting and determine that a PMCW radar signal interference condition exists. A possible response may be for the first and second PMCW radars to then begin taking turns transmitting and not transmitting based upon their independent detections of each other. Optionally, an exemplary radar system may use a randomization algorithm to choose a time slot to transmit, especially if there are multiple interferers. Such a process is similar to that used by Ethernet CSMA-CD.

When noise floor increases in a radar system sufficiently (due to an interferer using a code with different period (or aperiodic codes)), both PMCW radars may notice the increased noise floor, and both PMCW radars may switch to a periodic code with a known (same) period. Then, additional mitigation techniques, such as discussed above may be used.

Therefore, exemplary methods and systems of the present invention may mitigate interference in a PMCW radar system caused by transmitted radio signals from another PMCW radar system. The interference of the other PMCW radar system may be mitigated through passive (e.g., periodically or a periodically shifting transmission frequencies) steps that may be taken whether or not an interfering PMCW radar system has been detected and active steps (e.g., synchronizing transmissions between the two PMCW radar systems) that may be taken after the presence of the interfering PMCW radar is detected.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A radar sensing system comprising:
   one or more transmitters configured for installation and use with the radar sensing system, and configured to transmit phase modulated radio signals;
   one or more receivers configured for installation and use with the radar sensing system, and configured to receive radio signals that include transmitted radio signals transmitted by the one or more transmitters and reflected from objects in the environment; and
   a processor configured to control an operation of the one or more transmitters and the one or more receivers to mitigate interference present in the received radio signals and to avoid interfering radio signals transmitted by another radio transmitter;
   wherein the processor is operable to control the one or more transmitters and the one or more receivers to both actively and passively avoid and mitigate the interfering radio signals, and wherein the one or more transmitters are passively modified to avoid interference when no interference is detected.

2. The radar sensing system of claim 1, wherein the mitigating interference comprises at least one of:
   controlling the operation of at least one of the one or more transmitters and the one or more receivers to mitigate interference in the received radio signals when interference has been detected in the received radio signals; and
   controlling the operation of at least one of the one or more transmitters and the one or more receivers to mitigate interference in the received radio signals whether or not interference has been detected in the received radio signals.

3. The radar sensing system of claim 2, wherein the one or more receivers are configured to monitor a noise floor of the received radio signals, and wherein the processor is configured to determine that interference is present in the received radio signals when the noise floor rises above a threshold.

4. The radar sensing system of claim 2, wherein the processor is configured to selectively stop the one or more transmitters from transmitting, wherein the one or more receivers are configured to correlate the received radio signals during a period of time when the one or more transmitters have stopped transmitting, and wherein the processor is configured to determine that interference is present in the received radio signals when correlation output values comprise consistent correlation peak values during the period of time when the one or more transmitters have stopped transmitting.

5. The radar sensing system of claim 2, wherein the processor is configured to control the one or more receivers to correlate received radio signals with modulation codes not used by any of the one or more transmitters, and wherein the processor is configured to determine that interference is present in the received radio signals when the resultant correlation values are above a threshold.

6. The radar sensing system of claim 2, wherein the processor is configured to control the one or more transmitters to select carrier frequencies from among a plurality of frequencies, wherein the one or more receivers are configured to correlate the received radio signals, and wherein the processor is configured to determine that interference is present in the received radio signals at particular carrier frequencies when corresponding correlation output values are above a threshold.

7. The radar sensing system of claim 1, wherein the processor is configured to control the operation of at least one of the one or more transmitters and the one or more receivers to avoid interfering radio signals transmitted by another radio transmitter, such that at least one of the one or more transmitters and the one or more receivers operate in selected operational periods to avoid operational periods of an interfering radio transmitter.

8. The radar sensing system of claim 1, wherein the processor is configured to control the operation of the one or more transmitters to avoid interfering radio signals transmitted by another radio transmitter, such that the one or more transmitters periodically change a carrier signal according to a selected pattern, wherein the selected pattern is one of a periodic pattern and an aperiodic pattern, and wherein the processor is configured to control the operation of the one or more transmitters such that the one or more transmitters select carrier frequencies with minimal radio signal interference compared to the radio signal interference present in other carrier frequencies.

9. The radar sensing system of claim 1, wherein the processor is configured to control the operation of the one or more transmitters and the one or more receivers to avoid interfering radio signals transmitted by another radio transmitter, such that the one or more transmitters are synchronized with the interfering radio transmitter, and wherein the one or more transmitters and the interfering radio transmitter each modulate with orthogonal sets of Hadamard codes such that the one or more transmitters use a subset of available codes that is different from any of the codes used by the interfering radio transmitter.

10. The radar sensing system of claim 1, wherein the processor is configured to identify that a particular object detected by the one or more receivers is a ghost target caused by an interfering radio signal transmitted by another radio transmitter, and wherein the processor is configured to ignore any identified ghost targets such that any related interference in the received radio signals is ignored.

11. A method for operating a radar sensing system comprising a transmitter and a receiver, the method comprising:

transmitting, with the transmitter, a phase modulated radio signal;

receiving, with the receiver, a radio signal, wherein the received radio signal includes the transmitted radio signal transmitted by the transmitter and reflected from objects in the environment; and controlling the transmitter and the receiver to mitigate interference present in the received radio signals and to avoid interfering radio signals transmitted by another radio transmitter, wherein controlling the transmitter and the receiver actively and passively avoids and mitigates the interfering radio signals, and wherein the one or more transmitters are passively modified to avoid interference when no interference is detected.

12. The method of claim 11, wherein mitigating interference present in the received radio signals comprises at least one of:

controlling the operation of at least one of the transmitter and the receiver to mitigate interference in the received radio signals when interference has been detected in the received radio signals; and controlling the operation of at least one of the transmitter and the receiver to mitigate interference in the received radio signals whether or not interference has been detected in the received radio signals.

13. The method of claim 12 further comprising monitoring, with the receiver, a noise floor of the received radio signals, and determining there is interference in the received radio signals when the noise floor rises above a threshold.

14. The method of claim 12 further comprising:

selectively stopping the transmitter from transmitting;

correlating, with the receiver, the received radio signals during a period of time when the transmitter has stopped transmitting; and determining there is interference in the received radio signals when correlation output values comprise consistent correlation peak values during the period of time when the transmitter has stopped transmitting.

15. The method of claim 12 further comprising correlating, with the receiver, the received radio signals with modulation codes not used by the transmitter, and determining there is interference in the received radio signals when the resultant correlation values are above a threshold.

16. The method of claim 12 further comprising controlling the transmitter to select different carrier frequencies from among a plurality of frequencies, wherein the receiver correlates the received radio signals, and further comprising determining there is interference in the received radio signals at particular carrier frequencies when corresponding correlation output values are above a threshold.

17. The method of claim 12 further comprising controlling at least one of the transmitter and the receiver to avoid interference in the received radio signals, wherein at least one of the transmitter and the receiver operates in selected operational patterns to avoid operational periods of a radio transmitter transmitting an interfering radio signal, and wherein the selected operational pattern is one of a periodic pattern and an aperiodic pattern.

18. The method of claim 12 further comprising controlling the operation of the transmitter to avoid interfering radio signals transmitted by another radio transmitter, wherein the transmitter periodically changes a carrier signal according to a selected pattern, and further comprising controlling the operation of the transmitter to select a carrier frequency with minimal radio signal interference compared to the radio signal interference present in other carrier frequencies.

19. The method of claim 12 further comprising controlling the operation of the transmitter and the receiver to avoid interfering radio signals transmitted by another radio transmitter, wherein the transmitter is synchronized with the interfering radio transmitter, and wherein the transmitter and the interfering radio transmitter each modulate with orthogonal sets of Hadamard codes such that the transmitter uses a subset of available codes that is different from any of the codes used by the interfering radio transmitter.

20. The method of claim 12 further comprising identifying that a particular object detected by the receiver is a ghost target caused by interfering radio signals transmitted by another radio transmitter, and ignoring any identified ghost targets such that any related interference in the received radio signals is ignored.

* * * * *